March 30, 1948. R. A. KROPP 2,438,707
ROTARY TILLER TOOTH AND MOUNTING
Filed April 13, 1944 3 Sheets-Sheet 1

Inventor
Roy A. Kropp
by Joshua R. H. Potts
Attorney.

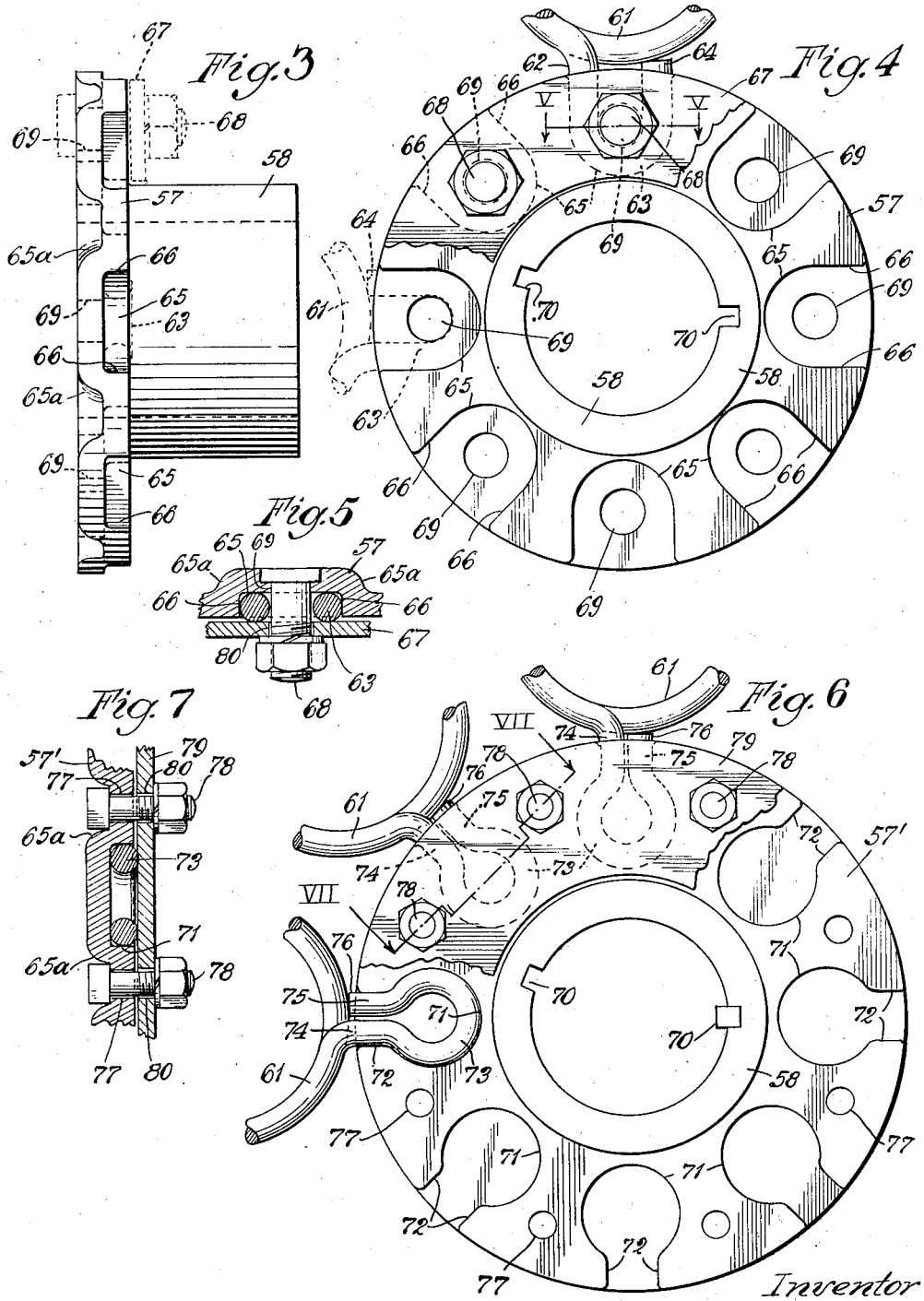

March 30, 1948. R. A. KROPP 2,438,707
ROTARY TILLER TOOTH AND MOUNTING
Filed April 13, 1944 3 Sheets-Sheet 3
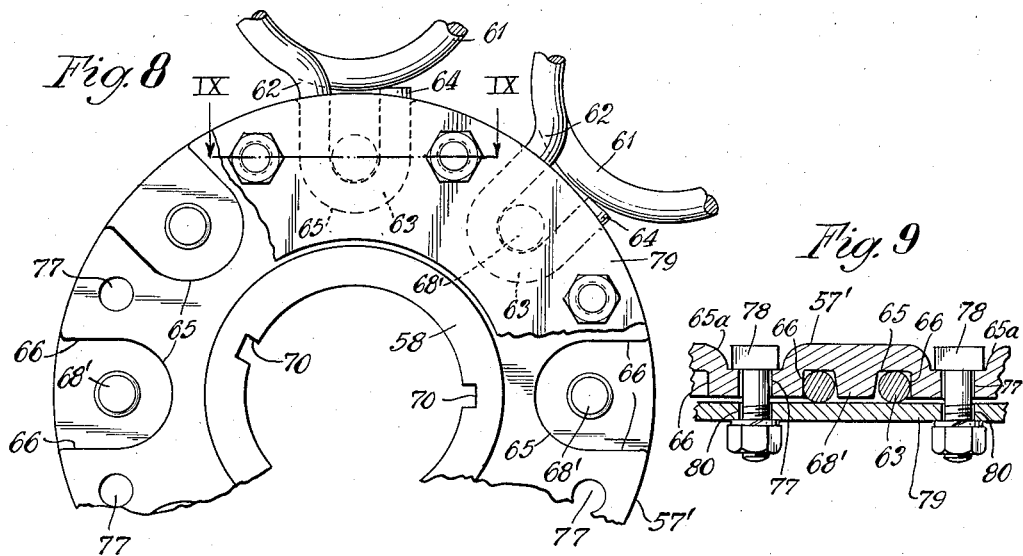
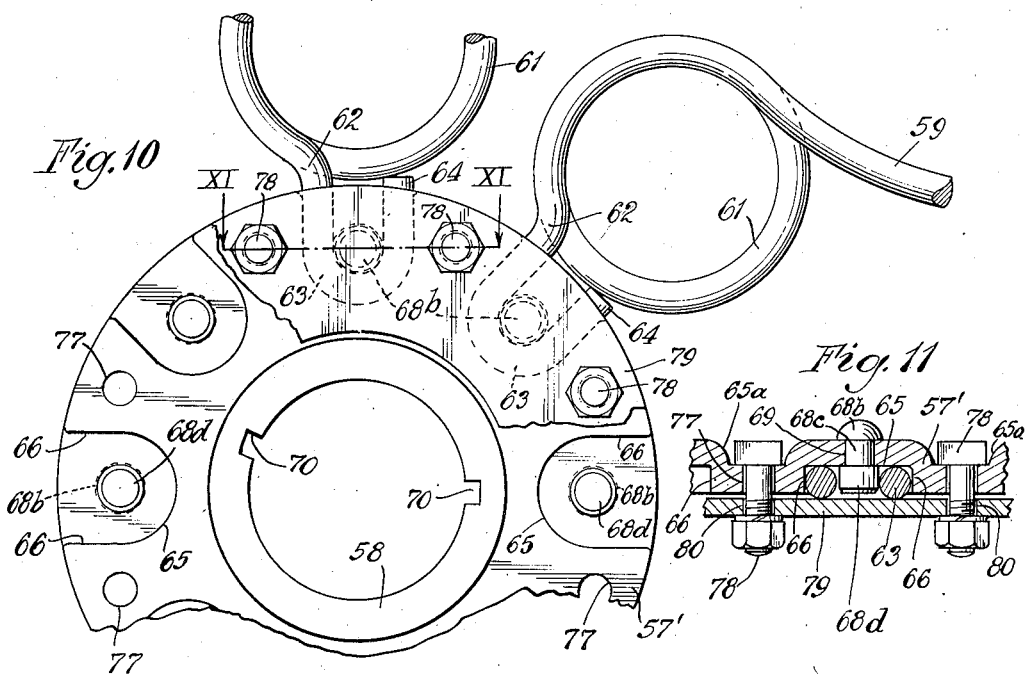
Inventor
Roy A. Kropp
by Joshua R. H. Potts
Attorney.

Patented Mar. 30, 1948

2,438,707

UNITED STATES PATENT OFFICE 2,438,707

ROTARY TILLER TOOTH AND MOUNTING

Roy A. Kropp, River Forest, Ill., assignor to Kropp Forge Company, Cicero, Ill., a corporation of Illinois Application April 13, 1944, Serial No. 530,797

3 Claims. (Cl. 97—216)

This invention relates to improvements in a soil conditioner in the form of a rotary tiller and cultivator adapted to be drawn over the ground, preferably by a motor-driven vehicle, or tractor, and having toothed blades, or tines to hack, cut or dig into the ground and thoroughly break up and pulverize the soil in preparing and conditioning land for seeding or planting.

An important object of the present invention is to provide in a rotary soil conditioner or tiller an improved soil disintegrating tine arrangement.

Another object is to provide a simple and novel mounting for the teeth, or tines, of a rotary soil conditioner or tiller wherein the tines are circumferentially arranged on independent supporting hubs or plates having sleeves connected to a common shaft to facilitate assembly and mounting thereof, as well as repair or replacement of the tines.

Another object is to so construct and mount the tines that they will be prevented from working loose and will be positively retained against displacement.

Another object is to facilitate manufacture and permit the mounting plates for the tines, together with their hubs or sleeves, to be readily made as forgings.

Further objects and advantages will appear and be brought out more fully in the following specification, reference being had to the accompanying drawings, in which—

Fig. 3 is an enlarged edge elevation of a mounting plate with its hub, or sleeve.

Fig. 4 is a face view of the mounting plate, shown in Fig. 3.

Fig. 5 is a sectional view, taken on the line V—V of Fig. 4.

Fig. 6 is a face view of another form of mounting plate with the securing means for the tines partly broken away.

Fig. 7 is a sectional view taken on the line VII—VII of Fig. 6.

Fig. 8 is a fragmentary face view of another form of mounting plate.

Fig. 9 is a sectional view taken on the line IX—IX of Fig. 8.

Fig. 10 is a view similar to Fig. 8 of another form of mounting plate, and

Fig. 11 is a sectional view taken on the line XI—XI of Fig. 10.

Figure 1:
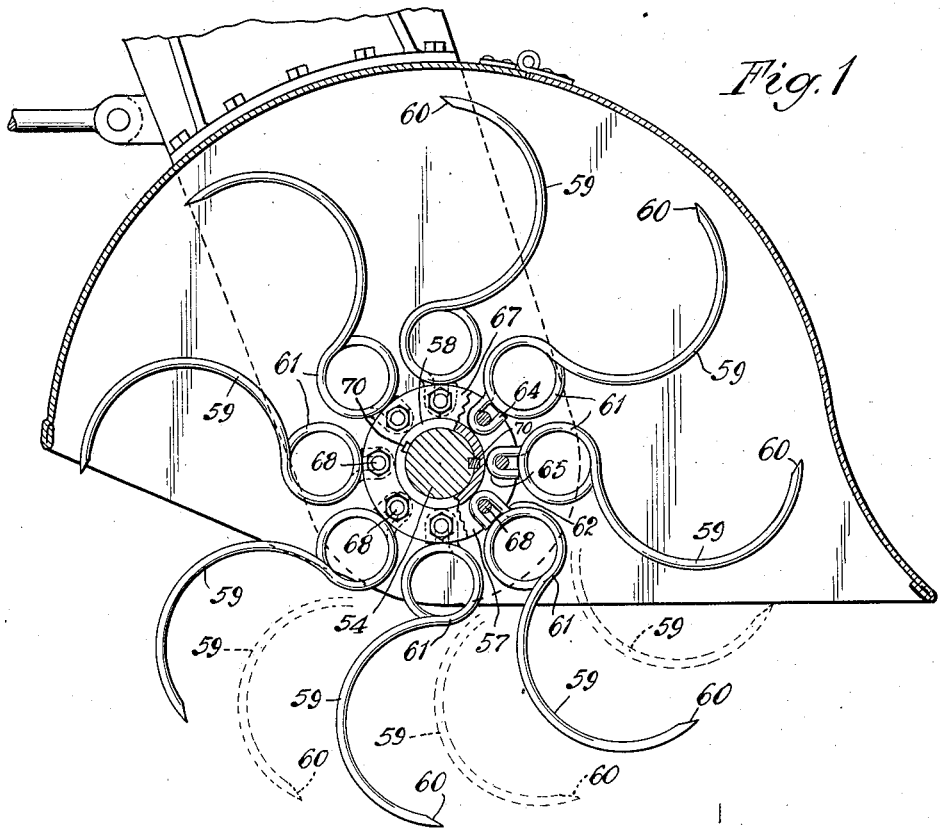
Figure 1 is a transverse vertical sectional view, partially in elevation, through a tiller rotor assembly embodying features of the present invention.

Having reference to Fig. 1 a rotor shaft is designated at 54 and is designed to take a plurality of mounting plates 57 radially formed at one end of sleeves or hubs 58, which are adapted to be arranged in endwise abutting relation with the plate or flange at one end against the end of the sleeve or hub of the adjacent plate and adapted to be adjustably fixed to the shaft, as will be later explained.

Tines or cutting blades 59, curved in reverse directions, that is, on an ogee or reverse curve, and having sharp points 60 adapted to cut or dig into the ground, are formed with coils or torsion springs 61 in their lengths and adjacent their inner portions. The outer curved portions of the tines are bent in an arc away from the direction of travel of the free ends thereof when rotated in use, so as to enter the ground rectilinearly of the points and cut into the ground on an arc at a suitable depth, such as eight or nine inches, which will define the depth of the cut in the soil in conditioning and preparing the latter for planting.

The coils or torsion springs 61 are adapted, when the tines pass or dig into the ground, to be wound up or placed under tension, so as to store up energy, and, upon coming out to release with a resilient action, which will effectively break the surface or crust of the ground and throw or wedge the soil against the hood thereover, to pulverize the soil in a manner to be further explained.

The spring metal of the tines merge from the coils at a point spaced from the center-line between the tip of the point 60 and the center of the coil 61, as shown at 62, and these end portions or shanks of the tines are formed with an open loop, eye, or hook 63, the end portions 64 of which terminate adjacent the coil spaced on the opposite side of the center-line and adjacent the outer surface of the coil 61, to better retain the tines in position in radial recesses 65 provided on a flat side of the plate 57.

These recesses are substantially U-shaped, or circular with open outer ends having flat sides 66. A plate or washer 67 is disposed against the loops 63 at the sleeve side of the plate 57 where the latter is provided with recesses 65 and clamping means or bolts 68 may be provided to engage holes 69 and 80 in the plates 57 and 67, held by washers and nuts. The heads of bolts 68 may project, as in Fig. 3, or be embedded or countersunk, as in Fig. 8. The bolts may be located at the centers of the recesses, or between them, if desired, so as to retain the loops or eyes and the tines firmly in position and against displacement or turning when tightly bolted.

By having the extremities 64 beneath the coils 61 when they open, part of the strain is removed from the bent portion of the coil where the loop or eye 63 is formed to help resist the load on the spring or metal of the tine due to the latter meeting with resistance in entering the ground or striking obstructions, and prevents the tines from working loose. The coils also, permit the tines to give or move upwardly and laterally to either side to pass obstructions and prevent breaking thereof.

The tine-carrying members, and more particularly the sleeves or hubs 58 thereof are arranged to be appropriately keyed to the shaft 54 (Fig. 1) and for this purpose are provided with spline grooves or keyways 70.

If desired, the plates 57 may, also, be provided with staggered recesses 65a in the opposite faces, but in either construction, manufacture as a forging is facilitated in producing the plates and sleeves together, recessed as described.

Figure 2:
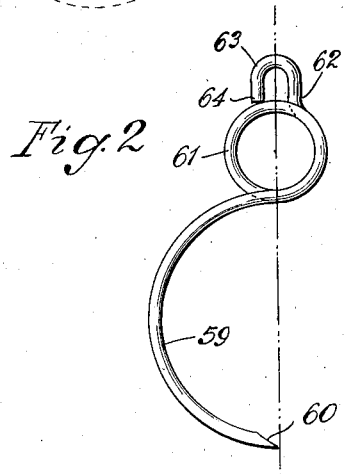
Fig. 2 is a detail elevation of one of the resilient tines.

The form of tine above set forth is shown in Fig. 2 and the mounting plate thereof in Figs. 3, 4 and 5. As shown in Figs. 6 and 7, the mounting plates may take a different form in which the plate portion 57' is provided with recesses 71 also of circular contour at their inner portions, but extending for the greater portion of a circle, and having restricted outer throat portions with parallel flat inner sides or faces 72 extending from the outer portions of the circular parts of the recesses 71 as chords of arcs of the circle parallel to the diameter, to the peripheral edge of the plate 57', in the same manner as the recesses 65 in the plate 57 extend to the peripheral edge of the plate 57, except that the outer portions of the recesses 65 are substantially the same width as the diameter of the circular portions of the recesses 65, or more than twice the diameter of the metal rod from which the tine is made.

On the other hand, the reduced portions 72 of the recesses 71 are substantially twice the diameter of the spring metal rod forming the tines. The purpose of this is to snugly receive the tines when formed in the manner shown in Fig. 6. In this form, each tine is provided with an open loop or eye 73, except that the shank portion, instead of being wide, and with the sides spaced apart as at the open loop or eye 63, which is substantially in the form of a hook with the bill extending outwardly, parallel to a diametrical line through the plate, and with both sides of the loop substantially parallel thereto, and to each other, is constricted. The eye 73 has a forwardly offset or bent portion 74 at the shank previous to the formation of the eye 73, and the end portion 75 is bent inwardly in an opposite direction toward the portion 74 to form a constricted shank portion corresponding to and snugly fitting the restricted throat portion 72 of the recess 71.

This is due to the fact that the outer portion 72 of the recess is substantially twice the size of the metal forming the tine so that the portions 74 and 75 are snugly and firmly held therein and prevented from radial displacement. The tines are thus arranged in circular planes or series on shaft 54.

Both forms may be readily assembled by moving the eye and shank into position axially, or toward the lateral face of the plate, and similarly displaced outwardly, but, cannot work loose or become displaced radially. Especially is this true in the form shown in Figs. 6 and 7 with the sides of the shank offset or curved and bent inwardly as described, and with the end portions 76 engaging the coils 61 in the same manner that the end portions 64 engage said coils.

Plate 57' is provided with holes 77, which may be between recesses 71, to receive connecting and clamping means, or bolts 78, and a retaining plate or washer 79 may be similarly mounted in position, as described, in connection with the other form of mounting plate, that is, a washer or annular plate may be provided for each bolt with washers and nuts, or a single annular plate may be provided for all to retain the anchored ends of the tines against lateral or axial displacement. This plate has spaced holes 80 to receive the clamping means or bolts 78, which, also, extend through the bores or holes 77 in the plate 57' at the recesses 65a, to clamp the parts together and hold the tines 59 in position.

In Figs. 8 and 9, the plate or washer 79 is disposed against the loops 63 at the sleeve side of the plate 57', where the latter is provided with radial recesses 65, extending through or communicating with the periphery thereof, as in previously described forms.

Projections, or studs 68', integral or attached to the plate 57, extend from the latter centrally at the depressed faces or bases of the recesses 65 to receive the loops 63 thereon when disposed in the recesses 65. This holds the coils or loops 63 and tines in position and against radial displacement and turning circumferentially, or otherwise, when the plate 79 is bolted in position by clamping means or bolts 78 engaging holes 77 and 80 in the plate 57' and retaining plate or washer 79. These bolts 78 are located at recesses 65a between the recesses 65, as in Figs. 6 and 7, and held by washers and nuts.

In Figs. 10 and 11 of the drawings, the construction is similar to that shown in Figs. 8 and 9, except that the projections, teats or studs 68b, instead of being integral with the plate 57, are in the form of headed rivets or separate pins having reduced shanks 68c anchored in the holes or bores 69 in the plate 57, centrally of the recesses 65 and formed with enlargements 68a in the recesses 65 to receive the loops 63 thereon when fitted in the recesses 65. Bolts 78 engage holes 77 and 80 in the plates 57' and 79 at recesses 65a.

In all forms, the retaining plates or washers, such as 67 and 79, engage the loops in spaced relation to plates 57 and 57', so that when the retaining plates are bolted in position and the washers and nuts tightened, the loops and tines will be firmly held in position and against lateral or radial displacement or from turning, but, may be readily removed or replaced, if necessary, such as where a tine is broken.

While I have illustrated and described certain preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A tiller comprising a hub having a radial plate portion of circular contour with recesses on one side communicating with the periphery thereof, said recesses having circular portions and restricted throat portions adjacent the periphery, tines having loops with constricted shanks seated in the recesses and throat portions, and means secured against the plate over the recesses and loops to prevent displacement of the tines and loops laterally from the recesses.

2. In a soil conditioner, a rotary shaft, a sleeve fixed to said shaft and having a radial flange with recesses in a face thereof extending through its peripheral edge, arcuately curved tines having pointed outer ends, a coiled spring portion adjacent the inner ends and substantially tangential to the periphery of said flange, and the inner end portion of each tine being reversely curved to form a loop fitting in its respective recess, and with the end thereof projecting outwardly to the periphery of a convolution of said coiled spring portion, and means securing said loop within said recess.

3. In a tiller, a rotary shaft, a sleeve fixed to said shaft and having a radial flange with recesses in a face thereof extending through its peripheral edge, arcuately curved tines having pointed outer ends, a coiled spring portion adjacent the inner ends substantially tangential to the periphery of said flange, and an inner end portion of each of said tines being reversely curved to form a loop fitting within its respective recess, and with an end thereof projecting radially outwardly to the periphery of a convolution of said spring portion, the sides of said loop being spaced equidistant each side of a line extending from the tip of the tine through the center of the coil, and means for securing said loop within said recess.

ROY A. KROPP.

REFERENCES CITED

The following references are of record in the file of this patent:

UNITED STATES PATENTS

| Number | Name | Date |
|---|---|---|
| 324,000 | Beutel | Aug. 11, 1885 |
| 328,670 | Hall | Oct. 20, 1885 |
| 622,162 | Pattison | Mar. 28, 1899 |
| 707,624 | Niles | Aug. 26, 1902 |
| 823,240 | Waterman | June 12, 1906 |
| 1,676,646 | Funk | July 10, 1928 |
| 1,768,289 | Mohr | June 24, 1930 |
| 2,214,702 | Seaman | Sept. 10, 1940 |
| 2,221,221 | Seaman | Nov. 12, 1940 |

FOREIGN PATENTS

| Number | Country | Date |
|---|---|---|
| 621 | Great Britain | 1852 |